T. F. CARLISLE.
METHOD OF MAKING SEAMLESS WIRE.
APPLICATION FILED MAR. 16, 1910.
978,846.
Patented Dec. 20, 1910.
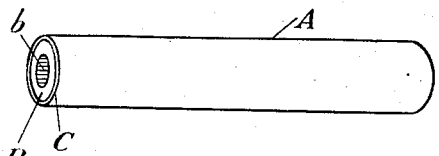
Fig. 1.
Fig. 5.
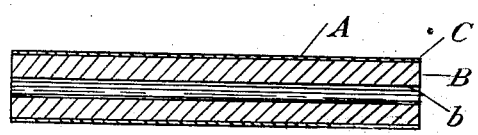
Fig. 2.
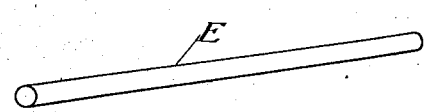
Fig. 6.
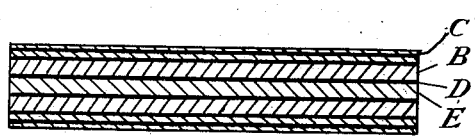
Fig. 3.
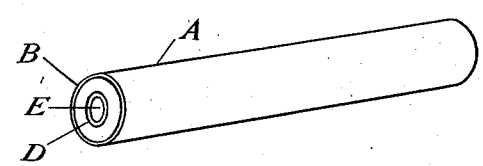
Fig. 7.
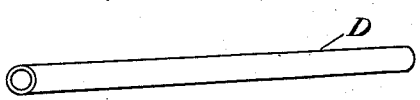
Fig. 4.
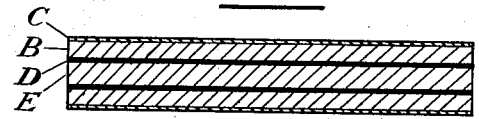
Fig. 8.
Fig. 9.
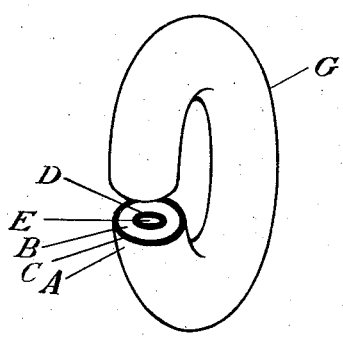
Fig. 10.
WITNESSES
Alfred H. Whatley
George H. McLaughlin
INVENTOR
Thomas F. Carlisle
By Horatio E. Bellows
ATTORNEY

UNITED STATES PATENT OFFICE.

THOMAS F. CARLISLE, OF PROVIDENCE, RHODE ISLAND, ASSIGNOR TO THE IMPROVED SEAMLESS WIRE COMPANY, A CORPORATION OF RHODE ISLAND.

METHOD OF MAKING SEAMLESS WIRE.

978,846.  Specification of Letters Patent.  Patented Dec. 20, 1910.

Application filed March 16, 1910. Serial No. 549,603.

*To all whom it may concern:*

Be it known that I, THOMAS F. CARLISLE, a citizen of the United States, residing at Providence, in the county of Providence and State of Rhode Island, have invented certain new and useful Improvements in Methods of Making Seamless Wire, of which the following is a specification.

My invention relates to an improved method of making seamless wire intended for use in ornamental chain links and other articles of jewelry.

The chain manufacturer cuts into suitable lengths a seamless precious metal plated wire having throughout its length a central plug or core of solder. Each length is bent into circular form and the abutting ends are heated to flow the solder over the faces to be united. It has been difficult, and in some cases impossible, to properly unite the faces because of the lack of continuity of the solder plug which is transversely fractured during the reducing step in the formation of the wire. During the elongation of the wire ingot these fractures increase leaving solderless intervals which, when they occur at the end of a link length, makes it impossible to perform the soldering operation. Furthermore only a small area upon the end faces of a link or wire length is available for the solder flow, and such area as exists is a comparatively narrow rim near the periphery of the link face which invites an excessive flow of solder defacing the exterior of the link. Neither is there any substantial holding area at the center of the joint which is an important defect of strength.

It is the purpose of my invention to produce a wire available for use in chain links and other articles of jewelry which is free from the defects above enumerated; and my invention consists in the novel process hereinafter described in conjunction with the accompanying drawings which constitute a part of this specification.

In the drawings Figure 1 is a perspective view of a plated tube, Fig. 2, a longitudinal section of the same, Fig. 3, a like section of another form of plated tube, Fig. 4, a perspective view of another form of solder tube, Fig. 5, a like view of another form of solder tube, Fig. 6, similar view of a core, Fig. 7, a perspective view of a complete ingot, Fig. 8, a longitudinal section of the same, Fig. 9, a side elevation of a length of completed wire, and Fig. 10 a detail view enlarged of a chain link.

In forming my wire I employ a tube A comprising a hollow member or body B of brass or other base metal, covered with a plating skin or shell C of precious metal. The shell may be simple, as shown in Figs. 1 and 2, or compound, as shown at C' in Fig. 3, and may be united to the member B in any usual convenient manner, as for instance, as shown in United States Patents No. 294,722, or No. 445,814, or, when the compound shell is employed, as shown in No. 618,165. It will, however, be noted that in my present structure the inner member B is hollow or tubular rather than solid as shown in the patents cited. The interior surface *b* of the plated tube A is properly fluxed and receives a tube D of solder which is also fluxed upon both its faces before insertion into the plated tube A. The solder tube may be seamless, as shown in Fig. 4, or be longitudinally slit throughout its length as at *d*, as shown in Fig. 5. The latter form is preferable in use. A rod or core E of brass or other base non-fusible metal, is fluxed and inserted tightly into the tube D. The described parts thus assembled constitute the ingot, as shown in Figs. 7 and 8, which is reduced to the desired diameter of wire, shown in Fig. 9, by swaging machines or rolls in the usual manner. This wire is used by the jeweler by cutting the same into lengths or blanks and bending the latter into links similar to that marked G in Fig. 10. It should be noted that during the reduction of the ingot the hard core E in conjunction with the surface *b* of the plated tube, guides and supports the solder tube so as to prevent fracture of the latter. Furthermore when the abutting ends of a link are heated to flow the solder, the end faces of the core E furnish an auxiliary area of hard metal at the very center of the joint which strengthens the union at the joint.

It will be noted that the advantageous results herein sought are attained essentially by the non-fusing of the solder tube D prior to the reduction of the assembled parts into wire.

What I claim is,—

1. A process for forming solder illed wire consisting in inserting into a cylindrical seamless plated body a non-fusible core surrounded by an independent solder tube, and reducing the diameter of the assembled parts.

2. A process for forming solder filled wire consisting in first, plating a base metal tube with a precious metal to form an ingot body, next inserting a solid core and an intermediate tube of solder within the body, and finally reducing the diameter of the assembled parts without fusing of the solder tube.

3. A process for forming solder filled wire, consisting in uniting by fusion a plating shell to a base metal tube, fluxing a base metal core and a solder tube, inserting the core within the solder tube, introducing the core and solder tube into the base metal tube, and reducing the assembled parts to wire without the fusion of the solder tube.

In testimony whereof I have affixed my signature in presence of two witnesses.

THOMAS F. CARLISLE.

Witnesses:
WILLIAM H. POLK,
JAMES M. TISDALE.